United States Patent
Benhase et al.

(10) Patent No.: US 8,819,291 B2
(45) Date of Patent: *Aug. 26, 2014

(54) COMPRESSION ON THIN PROVISIONED VOLUMES USING EXTENT BASED MAPPING

(75) Inventors: Michael T. Benhase, Tucson, AZ (US); Binny S. Gill, Auburn, MA (US); Lokesh M. Gupta, Tucson, AZ (US); Matthew J. Kalos, Tucson, AZ (US); Gail A. Spear, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 108 days.

This patent is subject to a terminal disclaimer.

(21) Appl. No.: 13/450,964

(22) Filed: Apr. 19, 2012

(65) Prior Publication Data

US 2012/0203983 A1 Aug. 9, 2012

Related U.S. Application Data

(63) Continuation of application No. 12/701,184, filed on Feb. 5, 2010, now Pat. No. 8,266,325.

(51) Int. Cl.
*G06F 15/16* (2006.01)

(52) U.S. Cl.
USPC .... 709/247; 709/223; 707/747; 707/E17.052; 711/209

(58) Field of Classification Search
USPC ................ 709/203, 247; 711/209; 707/747, 707/E17.052
See application file for complete search history.

(56) References Cited

U.S. PATENT DOCUMENTS

| 6,823,349 | B1 | 11/2004 | Taylor et al. |
| 6,857,059 | B2 | 2/2005 | Karpoff et al. |
| 7,054,249 | B2 | 5/2006 | Okada |
| 7,730,171 | B2 | 6/2010 | Frazier et al. |
| 8,266,325 | B2 * | 9/2012 | Benhase et al. ............... 709/247 |
| 2004/0103241 | A1 | 5/2004 | Chang et al. |
| 2005/0125614 | A1 | 6/2005 | Royer, Jr. |
| 2006/0236072 | A1 | 10/2006 | Lyon |
| 2011/0196987 | A1 | 8/2011 | Benhase et al. |

OTHER PUBLICATIONS

Lefebvre et al., "Perfect Spatial Hashing," International Conference on Computer Graphics and Interactive Techniques, Jul. 2006, pp. 579-588.

* cited by examiner

*Primary Examiner* — Yves Dalencourt
(74) *Attorney, Agent, or Firm* — Griffiths & Seaton PLLC

(57) ABSTRACT

A set of logical extents, each having compressed logical tracks of data, is mapped to a head physical extent and, if the head physical extent is determined to have been filled, to at least one overflow extent having spatial proximity to the head physical extent. Pursuant to at least one subsequent write operation and destage operation, the at least one subsequent write operation and destage operation determined to be associated with the head physical extent, the write operation is mapped to one of the head physical extent, the at least one overflow extent, and an additional extent having spatial proximity to the at least one overflow extent.

7 Claims, 6 Drawing Sheets

| Logical Extents | Physical Extents |
|---|---|
| Extent 1-8 | Head Extent 1, Overflow Extents 2, 3, 4 |
| Extent 9-16 | Head Extent 50, Overflow Extents 51, 52 |
| .... | |

FIG. 3

Track Location Metadata

| Physical Extent #: 1 |
|---|
| Location of tracks on the physical extent<br>================================<br>Logical Extent 1: Stride 1: Track 1 -> Physical Extent 1: Stride 1: Segment 1<br>Logical Extent 1: Stride 1: Track 2 -> Physical Extent 2: Stride 1: Segment 4<br>Logical Extent 1: Stride 1: Track 3 -> Physical Extent 1: Stride 1: Segment 5<br>Logical Extent 1: Stride 1: Track 4 -> Physical Extent 2: Stride 5: Segment 9<br>....<br>Logical Extent 1: Stride 2: Track 1 -> Physical Extent 1: Stride 1: Segment 10<br>Logical Extent 1: Stride 2: Track 2 -> Physical Extent 1: Stride 1: Segment 12<br>....<br>Logical Extent 8: Stride 100: Track 1: Physical Extent 3: Stride 100: Segment 1<br>.... |
| Free Space Map of Physical Extent 1<br>============================<br><br>Free space bitmap = 011000111.....<br>... |
| Free Space Map of Physical Extent 2<br>============================<br><br>Free space bitmap = 111111110001111.....<br>... |

FIG. 4

COMPRESSION ON THIN PROVISIONED VOLUMES USING EXTENT BASED MAPPING

CROSS REFERENCE TO RELATED APPLICATIONS

The present application is a Continuation of U.S. patent application Ser. No. 12/701,184, filed on Feb. 5, 2010.

FIELD OF THE INVENTION

The present invention relates in general to computers, and more particularly to a method, system, and computer program product for data compression using extent based mapping in a data storage system in a computing environment.

DESCRIPTION OF THE RELATED ART

In enterprise data processing arrangements, such as may be used in a company, government agency or other entity, information is often stored on servers and accessed by users over, for example, a network. The information may comprise any type of information that of programs and/or data to be processed. Users, using their personal computers, workstations, or the like (generally, "computers") will enable their computers to retrieve information to be processed, and, in addition, to store information, for example, on remote servers.

Generally, servers store data in mass storage subsystems that typically include a number of disk storage units. Data is stored in units, such as files. In a server, a file may be stored on one disk storage unit, or alternatively portions of a file may be stored on several disk storage units. A server may service access requests from a number of users concurrently, and it will be appreciated that it will be preferable that concurrently serviced access operations be in connection with information that is distributed across multiple disk storage units, so that they can be serviced concurrently. Otherwise stated, it is generally desirable to store information in disk storage units in such a manner that one disk drive unit not be heavily loaded, or busy servicing accesses, and while others are lightly loaded or idle. To provide redundancy and increase performance, many storage devices may be configured in a redundant array of independent disks (RAID) topology, where storage volumes are organized in RAID ranks.

A computer network of a business may have multiple storage networks that are located remote from one another and a business user. The storage networks may also be hosted on different types of systems. To perform the job correctly, the business user may require fast and reliable access to the data contained in all of the storage networks. Since access to this data occurs in real time, is desirable that storage operations (such as write or reads) occur as quickly as possible.

SUMMARY OF THE INVENTION

To achieve greater storage performance and reliability for customers, a variety of improvements to storage environments continue to be made. The so-called "thin provisioning" paradigm has become common in enterprise data processing systems. Thin provisioning allows administrators to configure logical storage units, such as volumes, without "real" or physically allocated storage behind them. "Real" storage is then allocated on demand. Control units perform the allocation of the storage in the data processing system in chunks of data referred to as extents, or contiguous areas of storage on a computer file system. Extents may vary in size, but are generally constant within a given control unit.

One method of allocating storage in thinly provisioned computing environments facilitates data compression using a space-efficient (SE) flashcopy (FLC) repository. Space efficient volumes are used to provide the ability to allocate volumes, the aggregate size of which might not exceed the current total storage capacity of the system. To provide write efficiency, all new writes are initially written in a log-structured fashion. When the SE volume pool becomes full, the new writes are written into holes created by earlier overwrites.

Use of SEFLC volumes may present various issues, however. Some of these issues may involve sequentiality of writes, overwrites, and sequential reads. For example, when multiple sequential writes occur to the same SE volume, the writes may become intermingled, and what would have been purely sequential in normal storage volumes becomes pseudo-sequential. During a sequential read, the data rate is correspondingly slower than that of a normal volume. Additionally, when some data that was previously sequentially written is then overwritten, the new data may or may not be written in place depending on the algorithm implemented. In cases where SE volumes are compressed, this issue may not be avoidable. The new write may be positioned in a location spatially distant from the original pages. Finally, when data that has been randomly overwritten is sequentially read, the performance may be negatively affected due to the scatter effect that random writes have on SE volumes.

In view of the foregoing, a need exists for a mechanism for facilitating data compression in thinly provisioned computing environments without the accompanying potential drawbacks previously described. Accordingly, various method embodiments for facilitating data compression are provided. In one exemplary embodiment, by way of example only, a set of logical extents, each having compressed logical tracks of data, is mapped to a head physical extent and, if the head physical extent is determined to have been filled, to at least one overflow extent having spatial proximity to the head physical extent. Pursuant to at least one subsequent write operation and destage operation, the at least one subsequent write operation and destage operation determined to be associated with the head physical extent, the write operation is mapped to one of the head physical extent, the at least one overflow extent, and an additional extent having spatial proximity to the at least one overflow extent.

Related system and computer program product embodiments are also disclosed and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which:

FIG. 3 is an illustration of an exemplary extent metadata table;

FIG. 4 is an illustration of exemplary track location metadata for a non-overflow event;

DETAILED DESCRIPTION OF THE DRAWINGS

The illustrated embodiments below describe efficient and highly scalable mechanisms for facilitation of data compression using extent based mapping in a data storage system, such as using extent space efficient volumes, for example. The illustrated embodiments maintain sequentiality of writes, and preserve locality during overwrites by implementing various extent mapping aspects as will be further described, following.

Throughout the instant description, the following terminology may be relevant. A "compression ratio" may refer to herein as a ratio of the size of an uncompressed data track to a compressed data track. This ratio may be set by a user, or may be a predefined ratio. A "compression storage unit" may refer to herein as a unit of storage for compressed tracks. For example, a unit can be decided as 50% of the average compression ratio for a track. For example, if a track is 64K and the compression ratio is 8, then a basic unit of storage may be a 4 k segment.

A "track" may refer to herein as a unit of storage having a certain number of segments. In one example, a particular track may have 17 segments. A "stride" may refer to herein as a group of tracks for which a corresponding RAID array generates a parity. For example, for a 6+P RAID-5 array, the corresponding stride is 24 tracks. An "extent" may refer to herein as an allocation unit of storage within a thinly provisioned volume, for example. An extent may include a large number of strides. A "head extent" may refer to herein as an extent to which a set of logical extents in a storage volume maps. Head extents are not shared across different sets of logical extents. A one to one mapping exists between a set of logical extents and head physical extents.

Figure 1:
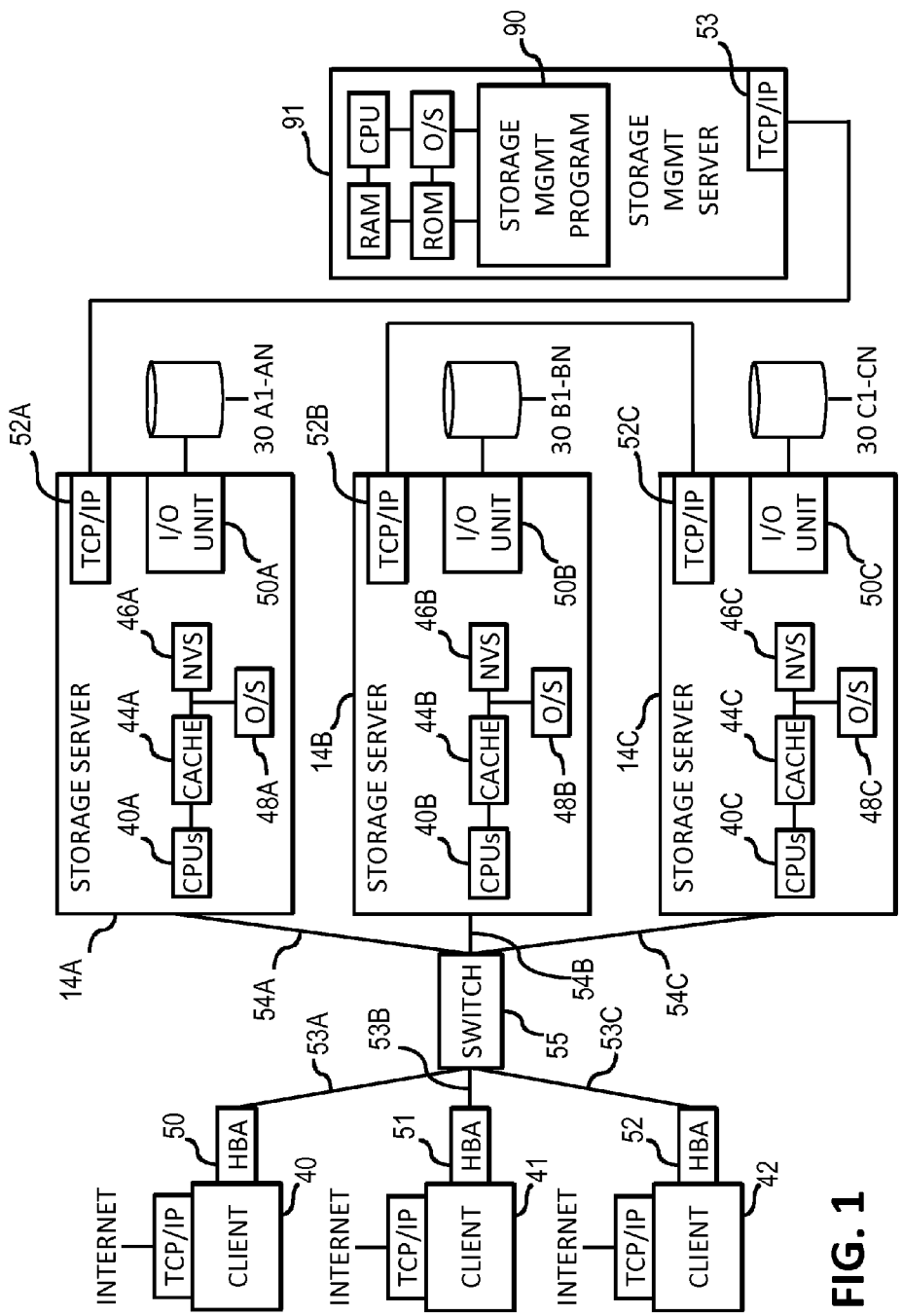
FIG. 1 is a block diagram of a distributed computer system including storage servers and a storage management server, in which aspects of the following description and claimed subject matter may be implemented.

Additionally, "overflow extents" may refer to herein as a set of extents associated with head extents for overflow use. A head extent's overflow extents are generally not shared across a set of logical extents. For an overflow, an overflow extent is chosen such that it is contiguous to the extents already allocated for a set of logical extents. However, if those spatially close extents are already allocated, a default position may utilize any available extent in the storage pool. In the extreme case where a large degree of fragmentation is present and/or no extents are available, overflow extents may be shared across a set of logical extents FIG. 1 hereafter provides one example of a portion of a mirrored data storage system architecture in which the mechanisms of the illustrative embodiments may be implemented. It should be appreciated, however, that FIG. 1 is only exemplary and is not intended to state or imply any limitation as to the particular architectures in which the exemplary aspects of the illustrative embodiments may be implemented. Many modifications to the architecture depicted in FIG. 1 may be made without departing from the scope and spirit of the following description and claimed subject matter.

FIG. 1 illustrates an exemplary distributed computer system generally designated 10 which includes the present invention. System 10 comprises multiple, similar storage servers/controllers 14 *a,b,c* with multiple CPUs 40 *a,b,c* per cluster (See FIG. 2, following, for CPU organization in each cluster), cache 44 *a,b,c*, nonvolatile storage ("NVS") 46 *a,b,c*, operating system 48 *a,b,c*, I/O unit 50 *a,b,c*, and TCP/IP adapter card 52 *a,b,c*. Each of the storage servers 14 *a,b,c* manages storage allocation and access to multiple storage devices (such as disks) 30*a*1-*an*, 30*b*1-*bn*, and 30 *c*1-*cn*, respectively, by clients 40, 41 and 42.

Clients 40, 41 and 42 have adapter cards 50, 51 and 52, such as a Fibre Channel adapter cards, for connection via a communication path 53 *a,b,c*, such as a Fibre Channel, to a switch 55. Switch 55 can be coupled to storage servers 14 *a,b,c* via host busses 54 *a,b,c*, and can forward a request from any of the clients 40, 41 or 42 to any of the storage servers 14, *a,b,c* as configured on the client. An administrator has allocated to each of the clients 40, 41 and 42 a number of storage "volumes". Each "volume" resides on a storage array. A "storage array" can comprise one or more storage devices and be configured in a variety of RAID levels such as RAID 5, RAID 10 or Just a Bunch of Disks (commonly referred to as JBOD).

Figure 2:
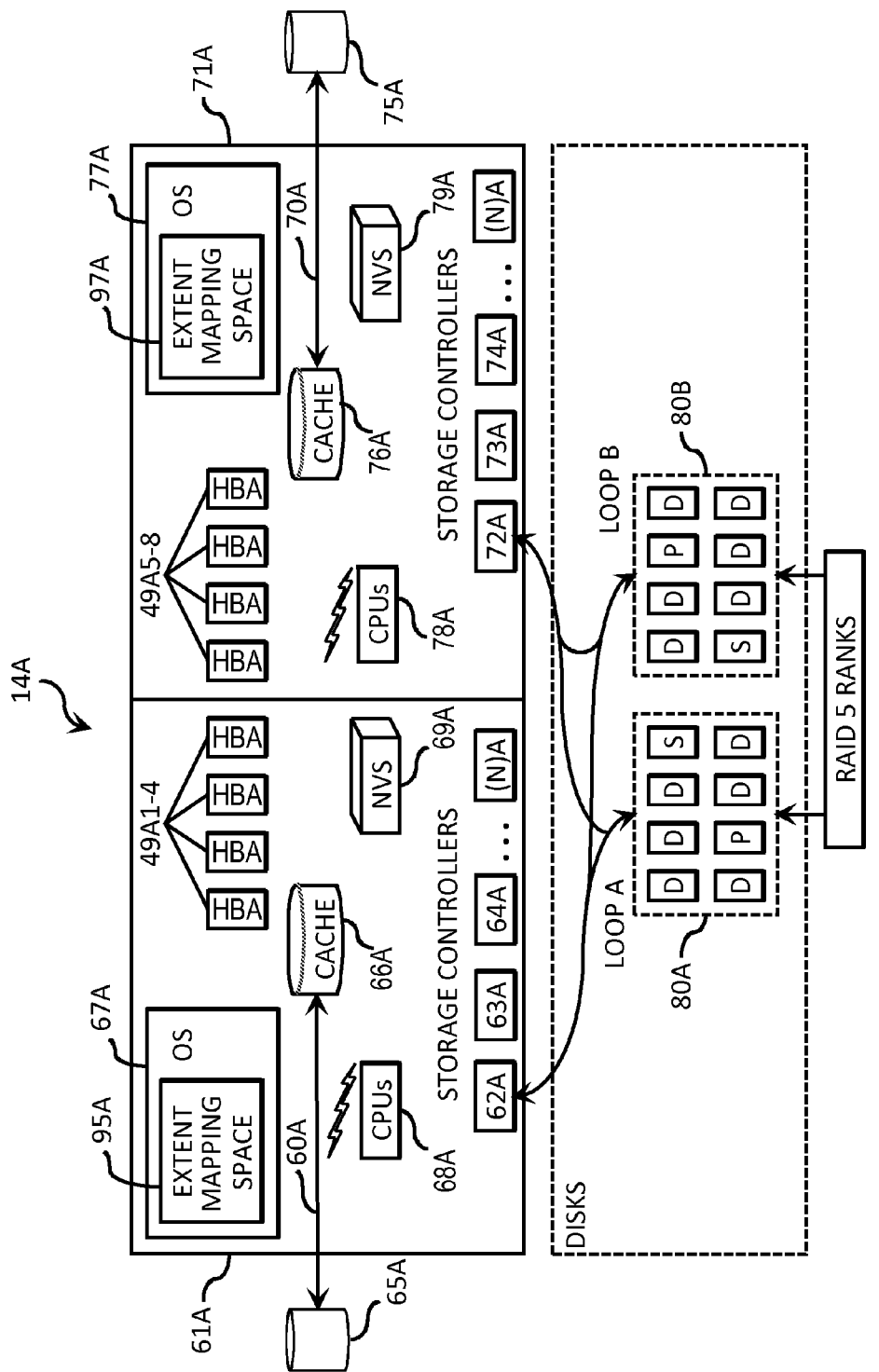
FIG. 2 is a block diagram of one of the storage servers of FIG. 1.

In the exemplary embodiment illustrated in FIG. 2, storage controller 14*a* (and likewise storage controller 14*b* and *c*) includes two identical clusters 61*a* and 71*a* of CPUs 68*a* and 78*a*, cache 66*a* and 76*a*, NVS 69*a* and 79*a*, and any number of pairs of device adapters (62*a*-(N)*a* and 72*a*-(N)*a* per cluster). There is a shared cache (semiconductor) memory 66*a* and 76*a* for each cluster 61*a* and 71*a*, respectively. Cache 66*a* and 76*a* each contain a directory of data files stored on each cache, respectively. The directory includes any number of directory entries associated with each of the data files.

Each cluster also contains battery backed-up storage 69*a* and 79*a* (also called "NVS"). In FIG. 2, "D" represents a data disk, "P" represents a parity disk for storing parity bits for the data in the data disks, and "S" represents a spare disk in the event of failure of a data disk or parity disk. Each cluster maintains a mapping of the storage allocation to each client that correlates each storage volume to corresponding physical locations on the storage arrays.

NVS 69*a* and 79*a* are interconnected with disks 65*a* and 75*a* via communication links 60*a* and 70*a*, respectively. In certain embodiments, communication links 60*a* and 70*a* are selected from a serial interconnection, such as RS-232 or RS-422, an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, disks 65*a* and 75*a* comprise one or more optical storage media, one or more magnetic storage media, one or more electronic storage media, and combinations thereof. In certain embodiments, disks 65*a* and 75*a* are external to clusters 61*a* and 71*a*. In certain embodiments, disks 65*a* and 75*a* are internal to clusters 61*a* and 71*a*.

When the client requests access to storage, i.e. to read from or write to data in one of the volumes allocated to the client, then the storage cluster that manages that volume will process the request, i.e. temporarily store client updates into the cache memory and NVS on the paired cluster. For update requests, an I/O completion notification is sent to the client upon NVS store. Upon reaching an internal threshold for pending writes, the cluster will map the client request to the physical locations, and then forward the mapped request from the cache storage to the appropriate storage array. For read requests, data is either satisfied from cache memory or requires disk access (because of a "cache miss"). Cache misses for read requests require the cluster to map the client request to the physical locations on the storage array and transfer the data from the physical location on the arrays to the cache memory where it satisfies the client I/O request.

Referring again to FIG. 1, system 10 also includes a storage management program (SMP) module 90 in a storage management server 91, according to the present invention to detect failover occurrences, implement the aforementioned preserved memory cache, and process the retained tracks. In the illustrated embodiment, computer 91 is coupled to storage servers 14 a,b,c via a SAN network. Alternately, there can be a separate instance of module 90 executing on each storage server/controller 14 a,b,c and communicating with the other instances of program 90 on the other storage servers via a TCP/IP network. One of ordinary skill in the art will appreciate that a variety of implementations of SMP module in communication with the overall storage subsystem are contemplated.

Referring again to FIG. 2, server 14a is shown including operating systems 67a and 77a, one for each cluster. As one of ordinary skill in the art will appreciate, operating systems 67a and 77a may be physically or virtually placed in a variety of locations. For purposes of illustration, the operating systems 67a and 77a are shown incorporated into each cluster as shown. In one embodiment, CPUs 68a and 78a may execute portions of the operating systems 67a and 77a. Each operating system 67a and 77a includes extent mapping modules 95a, 97a, as is shown. In one embodiment, extent mapping modules 95a and 97a may operate to implement various aspects of the present invention, in conjunction with the operating systems 68a and 78a, the depicted CPUs, cache memory, NVS, etc., such as carrying out data compression using extent based mapping using space efficient volumes. While extent mapping modules 95a and 97a are shown incorporated into the operating systems 68a and 78a, one of ordinary skill in the art will appreciate that the extent mapping modules may be physically or logically located elsewhere, yet remain in communication with the depicted CPUs, cache memory, NVS, etc. The functionality of extent mapping modules 95a and 97a will be further described, following.

As previously described, an extent may be considered a contiguous area of storage. In one embodiment, an extent may be 1 GB in size. One of ordinary skill in the art will appreciate that extents may vary in size, however. With a view to maintain sequentiality of writes, and preserve locality during overwrites, a pool (P) of extents may be defined that represents all extents available for a number of compressed volumes. P may be divided into extents that are numerically ordered to reflect the physical closeness on the respective storage media. For example, extent n and extent n+1 should be physically close in terms of cylinders on a disk or set of disks.

N may then be defined as a number of compressed volumes of different desired sizes to be carved out of the pool P of extents. A hash function H(v, e) may then be introduced that takes a compressed volume identification (id) and an extent number in that volume and maps to a head physical extent in P. For each write, a corresponding logical extent in a corresponding compressed volume is calculated. The hash is then calculated to arrive at the corresponding head physical extent that should house the write. Several overflow physical extents may be associated with a head physical extent. These overflow extents are spatially close to the head physical extent. To house a write, an extent within the head physical extent and overflow extents may be identified in a fashion so as to preserve locality. If the physical extent thus identified does not have any space for the write, then the write is allocated to the next physical extent from the head and overflow extents. If none of allocated head or overflow extents have space, then an additional extent may be allocated.

The illustrated embodiments provide solutions to the potential issues previously indicated regarding write sequentiality, overwrites, and sequential reads. For example, a number of parallel sequential writes will not be intermingled, but due to the hash function, will be allocated to differing extents (note, extent 0 of volume 1 is mapped to a differing head physical extent than extent 0 of volume 2, for example). In the case of overwrites, if overwrites to a compressed track cause movement to a new location, then the new location will be in the same extent or a spatially proximate extent. In this regard, spatial locality is preserved. For sequential reads, a predetermination of a compression ratio is not necessary. So-called "hot regions" (e.g., multiple consecutive extents) that are less compatible than others are eliminated due to the randomness of the aforementioned hash function. One of ordinary skill will appreciate that a variety of hash functions may be implemented depending on a particular situation.

A user may first create an extent pool for thinly provisioned volumes for compressed data. The user then may create as many compressed volumes as needed using this extent pool. The location of compressed logical tracks on physical storage may be described by compression metadata. Compression metadata may also be utilized to provide the location of free space on the physical storage. To facilitate use of such metadata, an extent metadata table may be initialized. The extent metadata may be configured to map logical extents in a particular compressed volume to head physical extents in the extent pool. For example, if the applicable compression ratio is 8:1, then 8 logical extents are mapped to 1 physical extent in the extent pool. The table may also be configured with a set of overflow extent information. In one exemplary embodiment, the table may be kept pinned in cache, as one of ordinary skill in the art will appreciate.

Turning now to FIG. 3, following, an exemplary extent metadata table is depicted. The extent metadata table includes two columns, a first column dedicated to the applicable logical extent(s) and a second column dedicated to the corresponding physical extent(s). For example, in the depicted embodiment, logical extents 1-8 are mapped to head physical extent 1, and overflow extents 2, 3, and 4. Similarly, logical extents 9-16 are mapped to head physical extent 50, and overflow extents 51, and 52, respectively.

As shown, a set of logical extents map to one head physical extent. A one to one mapping is seen between a set of logical extents and a head physical extent. To describe the specific relationship between logical extents and physical extent segments, a track location metadata table may be configured. Pursuant to such a metadata table, one track location table entry made for each head physical extent (and overflow extents associated with the head physical extent). Each table entry describes the location of all logical tracks that map to this physical extent, free space map for physical extent and the overflow extents. Track location metadata may be stored in the head physical extent that it describes. Storage in the head physical extent provides better performance since the data in the physical extent is likely going to be accessed after the metadata is accessed. With close proximity of data and metadata, two accesses occur more rapidly.

Track location metadata tracks will be cached in cache. However, nonvolatile storage (NVS) space is limited. As a result, in one embodiment, only delta updates are be stored in NVS. Once the metadata tracks have been destaged out of cache, delta updates stored in NVS may be discarded. If the NVS space for these delta updates becomes low, these metadata tracks may be destaged out of cache, and the corresponding delta updates may then be also discarded out of cache.

In one embodiment, the track location metadata may first include a location of all tracks that map into this extent. This describes the location of all the tracks in the logical extents that map to this physical extent. Returning to FIG. 1, all tracks of logical extents 1-8 map to physical extent 1. Physical extent 1 will have an entry for each track that exists in logical extents 1-8. In addition, the track location metadata may include a free space map. This describes total free space and location of free space in the physical extent and overflow extents.

FIG. 4, following, depicts exemplary track location metadata for a non-overflow extent. For the depicted physical extent #1, logical extent 1, stride 1, track 1 is mapped to physical extent 1, stride 1, segment 1, as shown. The logical extent mappings to physical extents continue as shown and in view of the previous description. Following the depicted mappings, the free space maps of physical extents 1 and 2 are depicted in bitmap form.

According to the mechanisms of the illustrated embodiments, allocation of extents may occur pursuant to new host writes and overflow cases as will be presently described. For new host writes, allocation for physical space is done on an extent basis after a write host. As was previously described, for each write, a calculation may be first performed to determine which logical extent in which compressed volume the logical extent belongs to. The hash is then computed to arrive at the corresponding entry in the extent metadata table and track location metadata tables. If no head physical extent is allocated for the computed hash table entry, then a head physical extent may be allocated. The hash table entry may then be updated following the allocation.

For each host write, the hash table entry is arrived at in the extent metadata table. If none of the physical extents (head or overflow) in the hash table entry have any space left to accommodate a new write, then a new overflow extent is allocated. An attempt is first made to allocate an extent that is spatially next to the extents already allocated for this entry in the extent metadata table. If an extent that is spatially close is not available, then the mechanisms may default to any free extent in the pool. In the extreme case, where no free extents are available and allocated overflow physical extents for other logical extent have space, those overflow extents may then be shared. Again, after a physical extent is allocated, the extent table metadata is updated.

In cases of staging/pre-staging, each request to stage a track will hash into the extent metadata table. From the extent metadata table, the physical extent in which the track resides is calculated. In one embodiment, microcode may then access the track location metadata for the physical extent. From the track location metadata, the physical location of the track to be staged is obtained. The track may then be staged from this physical location.

In cases of destaging, a destage for a track will also hash into the extent metadata table. As was the case in staging/pre-staging, the extent metadata table is used to obtain the physical extent in which the track resides. Microcode then may access the track location metadata for the physical extent. From the track location metadata, the physical extents where the tracks may be destaged is obtained.

An attempt is then made to find space in the physical extent where the track may be destaged. A best effort may be made to find space for the track to obtain/maintain spatial proximity to the tracks in which it is logically near. An examination of a previous number of tracks may be made to determine where the previous tracks are housed. As a next step, the mechanisms attempt to obtain physical space for this track. If not enough physical space exists for the track to be destaged, then a new physical extent may be allocated. Here again, the extent metadata table is updated following such allocation. The destage operation may then attempt to group a set of logical tracks that are similarly modified in cache and are logically proximate, and yet fit in the physical space found previously. All tracks that are grouped in such a manner are then destaged.

Figure 5:
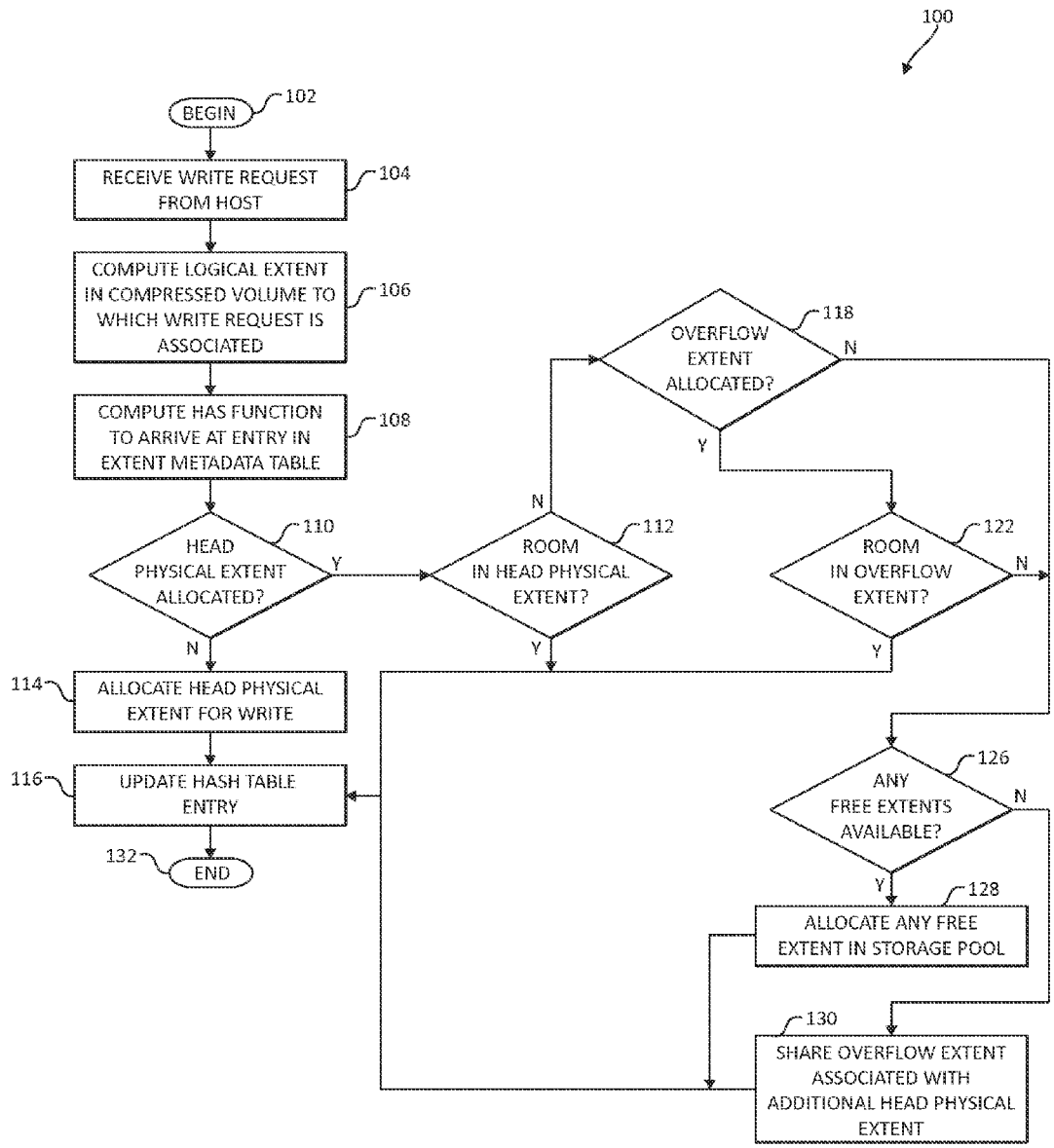
FIG. 5 is a flow chart diagram of an exemplary method for allocating a physical extent to a logical extent.
Figure 6:
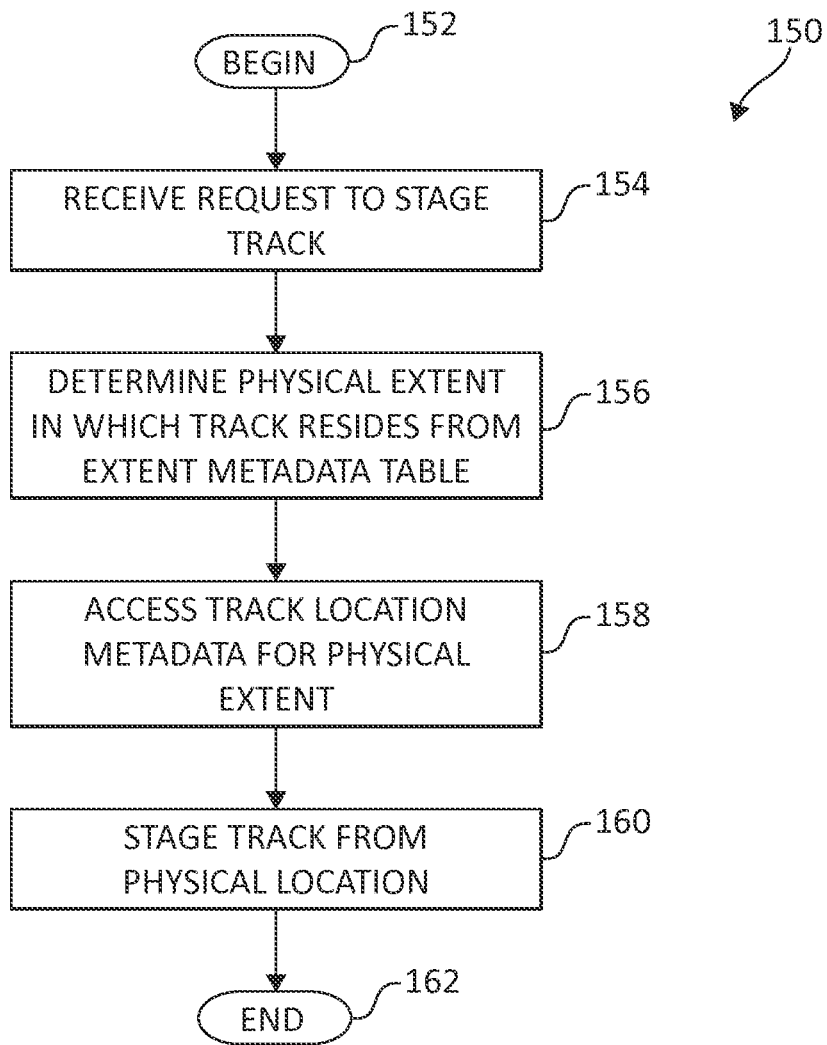
FIG. 6 is a flow chart diagram of an exemplary method for staging/pre-staging a track using an extent metadata table.
Figure 7:
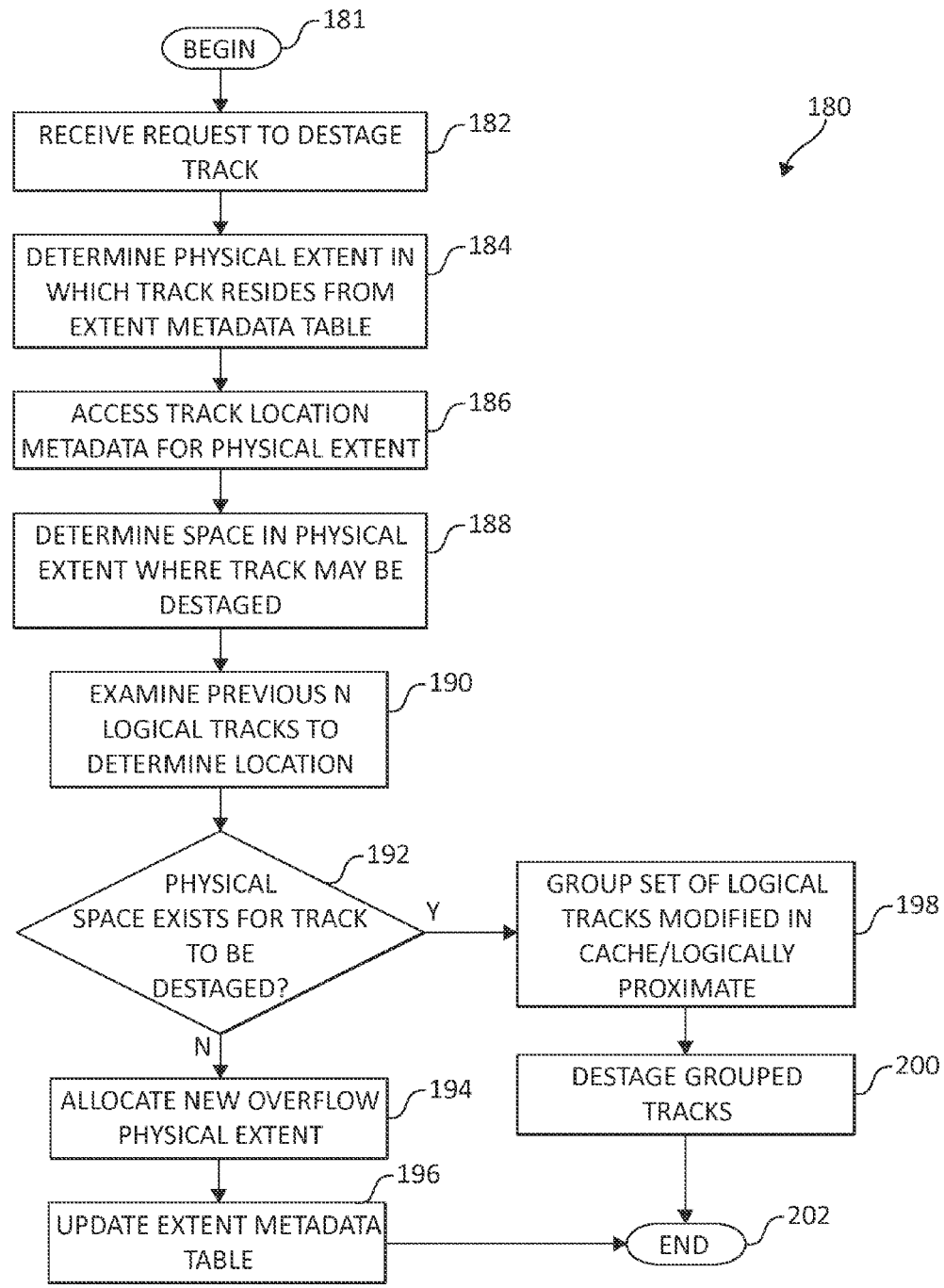
FIG. 7 is a flow chart diagram of an exemplary method for destaging a track using an extent metadata table.

Turning to FIGS. 5, 6, and 7, following, exemplary methods 100, 150, and 180 for data allocation, staging/pre-staging, and destaging according to the previously described mechanisms are illustrated. As one skilled in the art will appreciate, various steps in the methods 100, 150, and 180 may be implemented in differing ways to suit a particular application. In addition, the described methods may be implemented by various means, such as hardware, software, firmware, or a combination thereof operational on or otherwise associated with the storage environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Turning first to FIG. 5, method 100 depicts an exemplary flow for allocation of extents as previously described. Method 100 begins (step 102) with the receipt of a write request from the host (step 104). The logical extent in the compressed volume to which the write request is associated is then computed (step 106). The hash function is computed to arrive at the corresponding entry in the extent metadata table (step 108). If a head physical extent is allocated (step 110), and space is determined in the head physical extent (step 112), then the method 100 writes the data to the space found in the head physical extent, the hash table entry is updated (step 116), and the method 100 ends (step 132). Returning to step 110, if the head physical extent is not determine to have been allocated, a head physical extent is allocated for the write (step 114), and steps 116 and 132 continue as described.

Returning to step 112, if space is not found in the head physical extent, the method queries whether a corresponding overflow extent has been allocated (step 118). If this is the case, and there is space in the overflow extent (step 122), the overflow extent is used to write the data, and steps 116 and 132 continue as previously described. Returning to step 118, if the overflow extent is not allocated, then the method moves to step 126 as will be described. Returning to step 122, if space is not found in the overflow extent, the method 100 queries whether any free extents are available (step 126). If so, any free extent in the storage pool is allocated (step 128), the allocated extent is used to write the data, and steps 116 and 132 continue as previously described. If not, then an overflow extent associated with another head physical extent is shared and allocated (step 130), and again, step 116, and 132 continue as previously described.

Turning now to FIG. 6, method 150 describes an exemplary flow for staging/pre-staging operations in view of the previous description of the mechanisms of the illustrated embodiments. Method 150 begins (step 152) with a request to stage a respective track (step 154). The method 150 determines the physical extent in which the track resides from the extent metadata table (step 156). The track location metadata is then accessed to determine the physical extent location (step 158).

The track is then staged from the determined physical location (step 160), and the method 150 ends (step 162).

Turning finally to FIG. 7, method 180 describes an exemplary flow for destaging operations in view of the previous description of the mechanisms of the illustrated embodiments. Method 180 begins (step 181), with the receipt of a request to destage a track (step 182). The corresponding physical extent in which the track resides is then determined from the extent metadata table (step 184). The track location metadata is accessed to determine the physical extent's location (step 186), and the method 180 determines space in the physical extent where the track may be destaged (step 188). A number (N) of previous logical tracks are examined to determine their mapped physical location(s) (step 190), and the method 180 then queries whether physical space exists for the track to be destaged (step 192).

If enough physical space exists, the track is grouped with a set of logical tracks modified in cache that are logically proximate (step 198), and the group of tracks are then destaged (step 200). The method 180 then ends (step 202). Returning to step 192, if not enough physical space is found, then a new overflow physical extent is allocated (step 194), and the extent metadata table is updated (step 196). In one embodiment, the process of determining if an overflow extent has been allocated and if so, whether room exists in the overflow extent, may proceed in similar fashion to steps 118 and 122 as previously described in FIG. 5. Returning to the depicted embodiment, the method 180 ends (again, step 202).

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for facilitating data compression using a processor in communication with a memory device, comprising:
    mapping a set of logical extents, each of the set of logical extents having compressed logical tracks of data, to a head physical extent and, if the head physical extent is determined to have been filled, to at least one overflow extent having spatial proximity to the head physical extent; and
    pursuant to at least one subsequent write operation and destage operation, the at least one subsequent write operation and destage operation determined to be associated with the head physical extent, mapping the at least one subsequent write operation and destage operation to one of the head physical extent, the at least one overflow extent, and an additional extent having spatial proximity to the at least one overflow extent.

2. The method of claim 1, further including maintaining the mapping of the set of logical extents and the at least one subsequent write operation and destage operation in a metadata directory.

3. The method of claim 2, wherein maintaining the mapping of the set of logical extents and the at least one subsequent write operation and destage operation includes storing track location metadata describing the head physical extent in the head physical extent.

4. The method of claim 3, further including, pursuant to one of a stage and destage request for one of the compressed logical tracks of data, accessing the track location metadata describing the head physical extent to determine a physical location to perform one of a stage operation and the destage operation.

5. The method of claim 4, further including, subsequent to the destage request, performing at least one of:
    determining if space exists in the head physical extent where the one of the compressed logical tracks of data may be destaged,
    examining a previous number of the compressed logical tracks of data to calculate a closest spatial proximity of the one of the compressed logical tracks of data to the previous number of the compressed logical tracks of data, and
    if no space exists for the one of the compressed logical tracks of data, allocating one of the at least one overflow extent and the additional extent for the one of the compressed logical tracks of data.

6. The method of claim 1, wherein mapping the at least one subsequent write operation and destage operation includes calculating the mapping to the head physical extent using a hash function incorporating a compressed volume identification (id) and an extent number in a compressed volume associated with the compressed volume id.

7. The method of claim 6, wherein:
    calculating the mapping to the head physical extent using the hash function is performed for each of a possible plurality of head physical extents, and
    if the hash function returns a previously unallocated head physical extent of the possible plurality of head physical extents, the previously unallocated head physical extent is allocated to the set of logical extents.

* * * * *